United States Patent
Nilsson et al.

(10) Patent No.: US 9,557,996 B2
(45) Date of Patent: Jan. 31, 2017

(54) DIGITAL SIGNAL PROCESSOR AND METHOD FOR ADDRESSING A MEMORY IN A DIGITAL SIGNAL PROCESSOR

(71) Applicants: Anders Nilsson, Linköping (SE); Eric Tell, Linköping (SE); Erik Alfredsson, Linköping (SE)

(72) Inventors: Anders Nilsson, Linköping (SE); Eric Tell, Linköping (SE); Erik Alfredsson, Linköping (SE)

(73) Assignee: Mediatek Sweden AB (SE)

( * ) Notice: Subject to any disclaimer, the term of this patent is extended or adjusted under 35 U.S.C. 154(b) by 146 days.

(21) Appl. No.: 14/364,619

(22) PCT Filed: Nov. 28, 2012

(86) PCT No.: PCT/SE2012/051320
§ 371 (c)(1),
(2) Date: Jun. 11, 2014

(87) PCT Pub. No.: WO2013/095257
PCT Pub. Date: Jun. 27, 2013

(65) Prior Publication Data
US 2014/0351555 A1    Nov. 27, 2014

(30) Foreign Application Priority Data
Dec. 20, 2011  (SE) ...................................... 1151230

(51) Int. Cl.
*G06F 3/00*  (2006.01)
*G06F 12/02*  (2006.01)
(Continued)

(52) U.S. Cl.
CPC ............ *G06F 9/30036* (2013.01); *G06F 9/35* (2013.01); *G06F 12/06* (2013.01); *G06F 15/8061* (2013.01)

(58) Field of Classification Search
None
See application file for complete search history.

(56) References Cited

U.S. PATENT DOCUMENTS

| | | |
|---|---|---|
| 5,809,552 A * | 9/1998 | Kuroiwa ............. G06F 13/1615 710/107 |
| 6,594,710 B1 | 7/2003 | Cohen |

(Continued)

FOREIGN PATENT DOCUMENTS

| | | |
|---|---|---|
| GB | 2 365 588 A | 2/2002 |
| WO | WO 2007/018467 A1 | 2/2007 |

OTHER PUBLICATIONS

Anders Nilsson, Eric Tell, Dake Liu; AN 11 mm2, 70mW Fully Programmable Baseband Processor for Mobile WiMAX and DVB-T/H in 0.12 um CMOS; Jan. 2009; IEEE Journal of Solid-State Circuits; vol. 44, No. 1; pp. 90-97.*

(Continued)

*Primary Examiner* — Idriss N Alrobaye
*Assistant Examiner* — Richard B Franklin
(74) *Attorney, Agent, or Firm* — Tarolli, Sundheim, Covell & Tummino LLP

(57) ABSTRACT

In a digital signal processor comprising at least one vector execution unit and at least a first memory unit a third unit is arranged to provide addressing data in the form of an address vector to be used for addressing the first memory unit, said third unit being connectable to the first memory unit through the on-chip network, in such a way that data provided from the third unit can be used to control the reading from and/or the writing to the first memory unit. This enables fast reading from and writing to a memory unit of data in any desired order.

14 Claims, 3 Drawing Sheets

(51) Int. Cl.
*G06F 13/00* (2006.01)
*G06F 9/30* (2006.01)
*G06F 15/80* (2006.01)
*G06F 9/35* (2006.01)
*G06F 12/06* (2006.01)

(56) References Cited

U.S. PATENT DOCUMENTS

| | | |
|---|---|---|
| 6,976,147 B1 | 12/2005 | Isaac et al. |
| 7,334,110 B1 | 2/2008 | Faanes et al. |
| 2004/0181646 A1 | 9/2004 | Ben-David et al. |
| 2013/0185539 A1* | 7/2013 | Hung .................. G06F 15/76 712/3 |

OTHER PUBLICATIONS

Search Report for corresponding ITS/SE11/00332, completed Aug. 21, 2012 by Oskar Pihlgren of the Swedish Patent Office.
International Search Report for corresponding PCT/SE2012/051320 completed Mar. 12, 2013 by Stefan Kamps of the EPO.
Nilsson, et al.: "*An 11 mn$^{2}$ 70 mW Fully Programmable Baseband Processor for Mobile WiMAX and DVB-T/H in 0.12 μm CMOS*"; IEEE Journal of Solid-state Circuits, IEEE Service Center, Piscataway, NJ, USA, vol. 44, No. 1, Jan. 1, 2009, pp. 90-97, XP011241032, ISSN: 0018-9200; DOI: 10.1109/JSSC.2008. 2007167; cited in the application; whole document.

* cited by examiner

DIGITAL SIGNAL PROCESSOR AND METHOD FOR ADDRESSING A MEMORY IN A DIGITAL SIGNAL PROCESSOR

RELATED APPLICATIONS

The present invention is a U.S. National Stage under 35 USC 371 patent application, claiming priority to Serial No. PCT/SE2012/051320, filed on 28 Nov. 2012; which claims priority from SE 1151230-8, filed 20 Dec. 2011, the entirety of both which is incorporated herein by reference.

TECHNICAL FIELD

The present invention relates to a digital signal processor according to the preamble of claim 1. Such a processor is particularly suitable for OFDM systems.

BACKGROUND AND RELATED ART

Many mobile communication devices use a radio transceiver that includes one or more digital signal processors (DSP).

For increased performance and reliability many mobile terminals presently use a type of DSP known as a baseband processor (BBP), for handling many of the signal processing functions associated with processing of the received the radio signal and preparing signals for transmission.

Many of the functions frequently performed in such processors are performed on large numbers of data samples. Therefore a type of processor known as Single Instruction Multiple Data (SIMD) processor is useful because it enables the same instruction to be performed for a whole vector of data rather than on one integer at a time. This kind of processor is able to process vector instructions, which means that a single instruction performs the same function to a limited number of data units. Data are grouped into bytes or words and packed into a vector to be operated on.

As a further development of SIMD architecture, Single Instruction stream Multiple Tasks (SIMT) architecture has been developed. Traditionally in SIMT architecture one or two vector execution units that use SIMD data-paths have been provided in association with an integer execution unit, which may be part of a core processor.

International Patent Application WO 2007/018467 discloses a DSP according to the SIMT architecture, having a processor core including an integer execution unit and a program memory, and two vector execution units which are connected to, but not integrated in the core. The vector execution units may be Complex Arithmetic Logic Units (CALU) or Complex Multiply-Accumulate Units (CMAC). The data to be processed in the vector execution units are provided from data memory units connected to the vector execution units through an on-chip network.

The memory units comprise address generation units which are arranged to control the read or write order at any given time. For increased flexibility, the address generation unit can enable different readout modes, or patterns, such as reading from every nth address in the memory. These modes have to provide a regular pattern, which limits the possible ways data can be read or written. Further, the available modes are preselected for a particular address generation unit, and cannot be changed.

The article Nilsson, A and Tell, E: "An 11 mm2, 70 mW fully programmable baseband processor for mobile WiMAX and DVB-T/H in 0.12 μm CMOS", describes a SIMT type DSP and briefly states that "as the memory banks can accept external addressing from the network, integer memories as well as accelerators can be used to provide address sequences for irregular vector addressing. This also provides the ability to do indirect vector addressing". This article does not address any of the problems involved in actually implementing such a solution, and also hence does not provide a workable solution.

SUMMARY OF THE INVENTION

It is an objective of the present invention to enable a more flexible addressing of the data memories of a processor in SIMT architecture.

This objective is achieved according to the present invention by a digital signal processor comprising at least one functional unit, which may be a vector execution unit, an integer execution unit or an accelerator, and at least a first memory unit arranged to provide data to be operated on by the functional unit, a third unit and an on-chip network connecting the functional unit, the first memory unit and the third unit. The digital signal processor is characterized in that the third unit is arranged to provide addressing data in the form of an address vector to be used for addressing the first memory unit, said third unit being connectable to the first memory unit in such a way that data provided from the third unit can be used to control the reading from and/or the writing to the first memory unit and that the processor further comprises a memory address interface unit arranged to compensate for the latency between the first and the third unit.

The invention also relates to a method of addressing a memory in a digital signal processor comprising at least one functional unit and at least a first memory unit arranged to provide data to be operated on by the functional unit, and a on-chip network connecting the functional unit and the first memory unit, and a third unit arranged to provide addressing data for the first memory unit in the form of an address vector, said method comprising the steps of setting the first memory unit to receive addressing data from the third unit, providing addressing data from the third unit to the first memory unit, reading data from, or writing data to the first memory unit according to the addressing data.

Hence, according to the invention, addressing can be achieved fast and efficiently in any order throughout the memory unit. Data can be addressed in a memory in any order, as efficiently as an ordered sequence of data since the addressing may be handled in parallel with the processing performed by the functional unit. The first memory unit may be arranged to receive addressing data from the third unit through a dedicated bus or through the on chip network.

The memory address interface unit provides a solution to the problems caused by latency between the first and the third unit. In particular, a read signal from the first unit will take some clock cycles to reach the third unit. When starting read operations there will be a delay of several clock cycles before the first data item actually reaches the execution unit. By storing the first address samples in the memory address interface unit, before the first unit requests them, the delay at startup can be reduced.

The third unit may be any unit in the processor, for example a memory unit, referred to as the second memory unit, preferably an integer memory unit,
    a scalar execution unit,
    a vector execution unit, or
    an accelerator unit Different units may be used for the addressing of different memory banks.

The first memory unit may be a complex memory or an integer memory.

The memory address interface unit preferably comprises

Latency memory means arranged to store a number representative of the latency between the first and the third unit, Sample memory means arranged to store the sample number, that is, the number of address items to be transferred from the third unit to the first unit, A register for forwarding the address items from the third unit to the first unit Accordingly, the memory address interface unit is preferably arranged to perform the following functions:

reading at least a first address item from the third unit when the first unit connects to the third unit for obtaining address information, without waiting for a read signal when a read signal is received from the first unit, forwarding the first address item to the first unit reading following address items from the third unit subsequently until all address items have been read and forwarding the following address items to the first unit subsequently when read signals are received from the first unit.

The memory address interface unit preferably keeps track of the number of address items to read from the third unit by changing the sample counter each time an address item is read. This is advantageous because the memory address interface unit will continue to receive read requests from the first unit after it has read the last address sample from the third unit. In this way the memory address interface unit knows when to stop retrieving address items from the third unit. When the retrieval stops, only the last address samples are sent from the memory address interface unit to the third unit.

It is often important that all calculations are performed with the same timing, regardless of where the data are coming from. Since the latency may vary depending on which units are involved, an advantage of the invention is that the timing can be controlled by avoiding delay differences caused by different numbers of pipeline steps between different units.

In a particularly advantageous embodiment, the second memory unit comprises an address generation unit arranged to control the reading of address data from the second memory unit according to a predefined pattern. In this embodiment, the method may comprise the step of controlling reading of addresses from the second memory unit by means of an address generation unit arranged to control the reading of address data from the second memory unit according to a predefined pattern. This enables the handling of subsets of the addresses kept in the second memory unit, which is particularly advantageous for OFDM-based digital TV applications.

The processor according to the invention is particularly well suited for OFDM-based telecommunication standards, for example, according to the LTE and LTE advanced standards.

BRIEF DESCRIPTION OF THE DRAWINGS

In the following the invention will be described in more detail, by way of example, and with reference to the appended drawings.

DETAILED DESCRIPTION OF EMBODIMENTS

Figure 1:
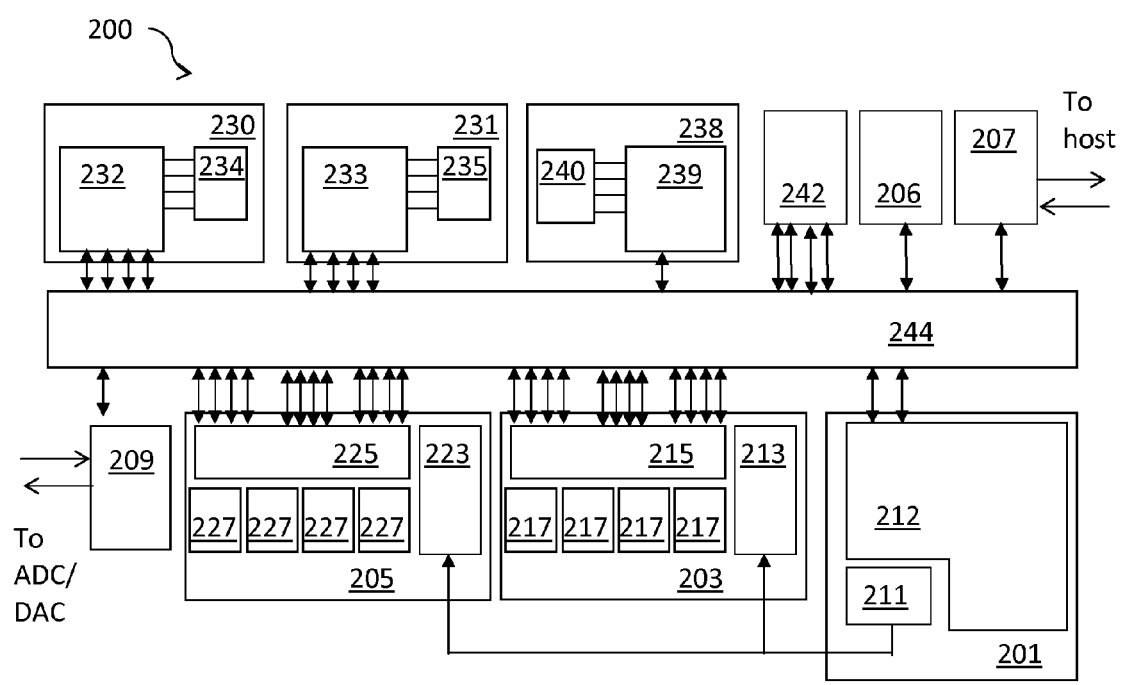
FIG. 1 illustrates an example of the SIMT architecture.

FIG. 1 illustrates an example of a prior art baseband processor 200 according to the SIMT architecture. The processor 200 includes a controller core 201 and a first 203 and a second 205 vector execution unit, which will be discussed in more detail below. A forward error correction (FEC) unit 206 is connected to the on-chip network. In a concrete implementation, of course, the FEC unit 206 may comprise several different units.

A host interface unit 207 provides connection to a host processor not shown in FIG. 1 in a manner well known in the art. A digital front end unit 209 provides connection to a front end unit in a manner well known in the art.

As is common in the art, the controller core 201 comprises a program memory 211 as well as instruction issue logic and functions for multi-context support. For each execution context, or thread, supported this includes a program counter, stack pointer and register file (not shown explicitly in FIG. 1). Typically, 2-3 threads are supported. The controller core 201 also comprises an integer execution unit 212 of a kind known in the art.

The first vector execution unit 203 in this example is a CMAC vector execution unit, and the second vector execution unit is a CALU vector execution unit. Each vector execution unit 203, 205 comprises a vector controller 213, 223, a vector load/store unit 215, 225, and a number of data paths 217, 227. The vector controller of each vector execution unit is connected to the program memory 211 of the controller core 201 via the issue logic, to receive issue signals related to instructions from the program memory.

The function of the data paths 217, 227 and the vector load/store units 215, 225 is well known in the art and will not be discussed in any detail in this document.

There could be an arbitrary number of vector execution units, including only CMAC units, only CALU units or a suitable number of each type. There may also be other types of vector execution unit than CMAC and CALU. As explained above, a vector execution unit is a processor that is able to process vector instructions, which means that a single instruction performs the same function to a number of data units. Data may be complex or real, and are grouped into bytes or words and packed into a vector to be operated on by a vector execution unit. In this document, CALU and CMAC units are used as examples, but it should be noted that vector execution units may be used to perform any suitable function on vectors of data.

As is known in the art, a number of accelerators 242 are typically used, since they enable efficient implementation of certain baseband functions such as channel coding and interleaving. Such accelerators are well known in the art and will not be discussed in any detail here. The accelerators may be configurable to be reused by many different standards.

An on-chip network 244 connects the controller core 201, the digital front end unit 209, the host interface unit 207, the vector execution units 203, 205, the memory banks 230, 231, the integer bank 238 and the accelerators 242. Vector execution units, scalar execution units, integer execution units and accelerators are collectively referred to in this document as functional units. A scalar execution unit is only able to process one sample at a time, but this sample may have a real or complex value.

To enable several concurrent vector operations, the processor preferably has a distributed memory system where the memory is divided into several memory banks, represented in FIG. 1 by Memory bank 0 230 to Memory bank N 231. Each memory bank 230, 231 has its own memory 232, 233 and address generation unit AGU 234, 235 respectively. The memories 232, 233 are typically, but not necessarily, complex memories. This arrangement in conjunction with the on-chip network improves the power efficiency of the memory system and the throughput of the processor as multiple address calculations can be performed in parallel. The baseband processor of FIG. 1 preferably also includes integer memory banks 238, each including a memory 239 and an address generation unit 240.

Each memory has address pointers indicating the position in the memory that should be read or written next.

For example, the commands out r0, CDM0_ADDR out r1, CDM1_ADDR set the positions in complex data memory 0 and complex data memory 1, respectively, that should be read from or written to.

Each address generation unit 234, 235 performs an address calculation to control the order in which data are to be read from or written to the corresponding memory 232, 233. For increased flexibility, the address generation unit can also be arranged to enable two or more different modes. Several such modes are known in the art. The address generation logic can for example perform: linear, bit reversed, modulo and 2D-addressing with different increments, including negative increments. For example, the address generator can be arranged to read every K:th data item according to the addressing function, K being an integer. Alternatively, the address generator might be arranged to address the memory backwards. Hence, as an example, if the start address is 0, the address generator can be arranged to read from the corresponding memory according to three different modes:

Read each address consecutively, that is, 0, 1, 2, 3, 4, 5, 6, 7

Read every K:th address, that is, if K=2; 0, 2, 4, 6

If the start address is 10 and K=-2

Read backwards, that is 10, 8, 6, 4, 2, 0

In order, for example, to make a vector execution unit multiply data items from two different memories, the command might look as follows:

cmac.n CDM0, CDM1 n being the length of the vector to be operated on. This would then be performed on a vector of n data items from each of the memories CDM0 and CDM1, starting with the data item indicated by the pointer of the respective memory.

As long as the data of a particular memory is to be read consecutively, or in an order supported by its address generation unit, there is no problem. But the address generator does not support a situation where the vector to be operated on by the vector execution unit was held in the memory in an irregular order. For example, multiplying together the sequences CDM0[1, 3, 7, 5, 11]and

CDM1[0,1,2,3,4]

would be a very complicated operation because there is no regular pattern in the sequence to be read from CDM0. According to the prior art, therefore the address would have to be set in the AGU manually, before each reading of data from the memory. This would cause a significant delay in reading the data which would reduce the processor's overall performance.

Figure 2:
FIG. 2 illustrates the function of address pointers.

FIG. 2 illustrates the function of the address pointer in a first and a second memory unit. Each memory unit comprises a number of data items, including a sequence of data that is to be provided as input data to a vector execution unit.

The first memory unit 230 is CDM0 and the relevant sequence of data is shown as a block 230a in this memory unit. An address pointer 230b points to the start of this block, to indicate where reading of data should start.

The second memory unit 231 is CDM1 which also has a sequence of data to be used as input data by a functional unit, such as a vector execution unit. This sequence of data is shown as a block 231a, with an address pointer pointing 231b to the start of this block. As can be seen, the location of the sequence of data 231a in the second memory 231 may be different from the location of the sequence of data 230a in the first memory 230.

As the reading proceeds, the pointer will move to point to the next address to be read from at any given time. Traditionally, the pointer information is taken from the address generation unit 234, 235, of the corresponding memory 230, 231.

Figure 3:
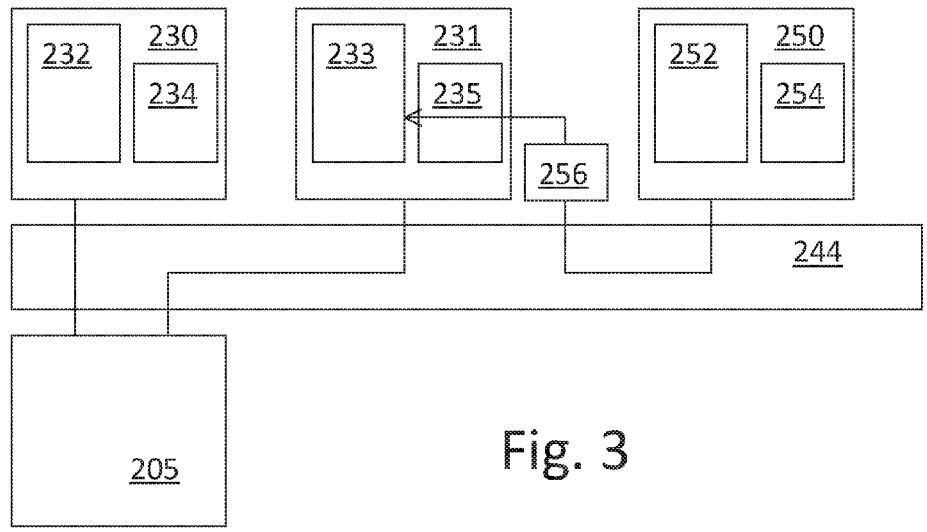
FIG. 3 illustrates a first embodiment of the invention in a simplified example of the SIMT architecture.

FIG. 3 is a simplified drawing showing only the parts of the SIMT architecture that are particularly relevant for the present invention. The parts shown, using the same reference numerals as in FIG. 1, are: one of the vector execution units, in this example the CALU vector execution unit 205, the first 230 and second 231 memory bank, and the on-chip network 244 connecting these three units together. As before, each of the memory banks 230 and 231 comprises a memory 232, 233, and an address generation unit 234, 235. There is also a third memory bank 250 comprising a memory 252 and an address generation unit 254. The third memory bank is also connected to the other units through the network 244.

The third memory bank 250 is typically an integer memory bank, which makes it suitable for holding address information in the form of a data vector which may be referred to as an address vector. This memory bank is sometimes referred to as the address memory in this document. Otherwise, it may be of exactly the same type as the first and second memory banks 230, 231, which are referred to as data memories. According to the invention the memory 252 of the third memory bank 250 holds an address vector to be used for the addressing of the second memory bank 231. As shown symbolically by the arrow connecting the second and the third memory bank the connection bypasses the address generation unit 235 of the second memory bank 231 to address the memory 233 directly.

Since the data in the memory 252 of the third memory bank 250 can be changed quite easily, this provides a very flexible way of addressing the second memory bank 231.

Reading address data from a separate memory unit introduces additional latency in the system. When the execution unit is ready to start receiving data from the second memory bank, it will send a read signal to the second memory bank, which is the bank that is to provide the data for the calculations performed by the execution unit. The second memory bank will then send a read signal to the address memory bank. The address memory bank will respond by sending its first address item to the second memory bank. Only then can the second memory bank send the data item to the execution unit. Hence there will be a latency which will cause a delay at startup of a vector execution.

In order to overcome this delay, in this embodiment a memory address interface unit 256 is arranged between the address bank 250 and the second memory bank 231. The memory address interface unit 256 serves as a memory address interface unit for intermediate storage of the address items retrieved from the third memory bank 250. The design and functions of the memory address interface unit 256 will be discussed in more detail in connection with FIG. 5.

As a complement, the address generation unit 254 of the third memory bank 250 can also be used to set a readout mode, as discussed above in connection with FIG. 1, for example to read every other data item from the third memory bank. This means that in some situations the same contents of the third memory bank can be used for different applications. For example, a repeat function could be achieved.

As will be understood, a similar arrangement might be used also for addressing the first memory bank 230, or the address generation unit 234 of the first memory bank could be used in a conventional way. Further, any number of memory banks and functional units, of any kind, might be provided. There might be a number of memory banks that could be used as address memories. A memory bank could easily change the order in which its entries were read or written, by connecting to the appropriate address memory, since all units are interconnected through the network 244.

Figure 4:
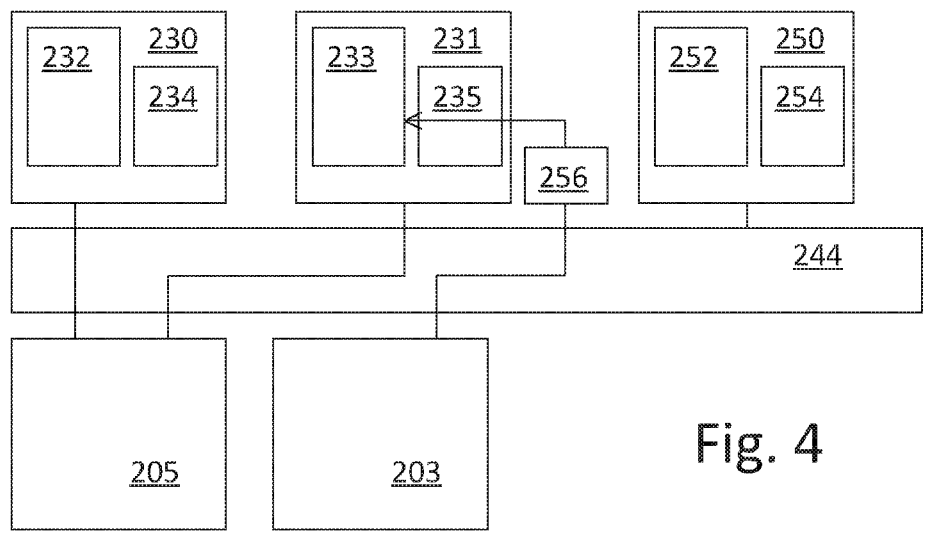
FIG. 4 illustrates a second embodiment of the invention in a simplified example of the SIMT architecture.

FIG. 4 illustrates another embodiment of the invention. The parts shown, using the same reference numerals as in FIG. 1, are: the CMAC vector execution unit 203, the CALU vector execution unit 205, the first 230 and second 231 memory bank, and the network 244 connecting these three units together. As before, each of the memory banks 230 and 231 comprises a memory 232, 233, and an address generation unit 234, 235. A third memory bank 250 is also shown, comprising a memory 252 and an address generation unit 254. The third memory bank is also connected to the other units through the network 244 and may be used as an address memory as discussed in connection with FIG. 3. In the embodiment shown in FIG. 4, the second memory bank 235 is addressed from the CMAC vector execution unit 203. This means that the addresses to be read from the second memory bank 231 are being calculated in the CMAC vector execution unit 203. Of course, this is only an example. As the skilled person would realize the addressing could be performed from a CALU vector execution unit or from any other type of functional unit such as a vector execution unit, another execution unit or accelerator.

Figure 5:
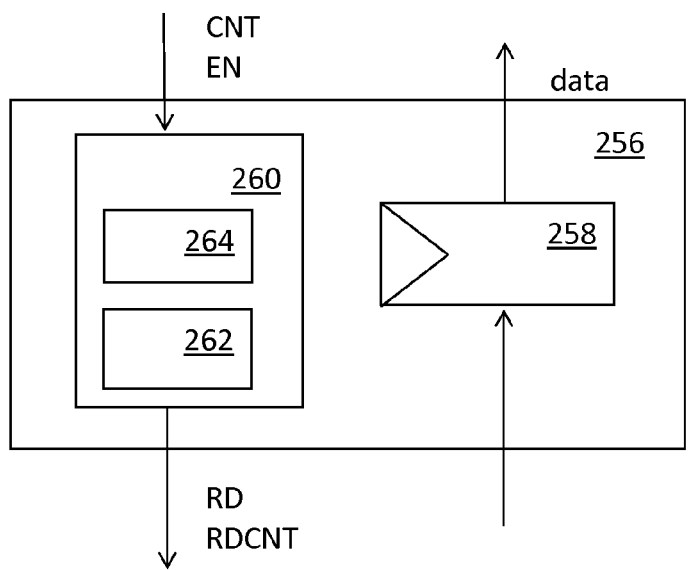
FIG. 5 illustrates a memory address interface unit according to an embodiment of the invention.

As will be understood, the embodiments shown in FIGS. 4 and 5 could be combined so that some memory banks would be addressed by means of their internal address generation units 231, 233, others would be addressed from separate memory banks 250, and yet others from functional units 203, 205.

By using another vector execution unit to calculate the addresses from which to read in a particular memory, memory addressing can be achieved in a very flexible way. This is particularly useful in applications such as Pilot extraction and user separation in OFDM systems Rake finger processing in CDMA systems A method according to the invention of enabling the addressing of one memory unit from another unit of the network, for example, integer data memory IDM:

1) Set the first memory unit, for example, CDM0 to use IDM as an address source

2) Set the second memory unit, for example, CDM1 to use linear addressing by means of its address generation unit 3) Process the data in the vector execution unit, for example calculations, on the data provided from the first and second memory unit in the order they are provided.

4) For each data item read from the memory unit by the vector execution unit, the memory is programmed to retrieve a new address from the network, that is, either from the third memory unit, in the embodiment of FIG. 3, or from the second vector execution unit, in the embodiment of FIG. 4. The new address will indicate the position in the first memory unit from which data is to be read next.

Alternatively, for writing the results of the processing performed by a vector execution unit to a data memory:

1) Set the first memory unit, for example, CDM0 to use IDM as an address source

2) Set the second memory unit, for example, CDM1 to use linear addressing by means of its address generation unit 3) Process data in the vector execution unit, for example calculations, and write the result to a data memory.

4) For each data item written to the data memory unit by the vector execution unit, the memory is programmed to retrieve a new address from the network, that is, either from the third memory unit, in the embodiment of FIG. 3, or from the second vector execution unit, in the embodiment of FIG. 4. The new address will indicate the position in the data memory to which data should be written next.

In the example methods above, of course the addressing data could be obtained from a vector execution unit or from some other unit in the processor, instead of the address memory.

In both the examples shown in FIGS. 3 and 4, the address information to be provided from the address memory, or from the appropriate vector execution unit, respectively, must be timed in such a way that the next address to be read from, or written to, reaches the second memory bank one clock cycle before it should actually be read from or written to. That is: there should be a read ahead of data elements because of pipelining. The amount of data that is read ahead may be controlled by control signals that are propagated from the memory block that is addressed through the network to the address source. Alternatively, it may be controlled by a fixed value programmed into the memory address interface unit. The read ahead can also be implemented by address sources pushing a pre-defined amount of address data over the network, where the number of pipeline stages is encoded in the hardware.

In order to overcome the problems caused by latency between the vector execution unit 203 providing the address data and the memory bank 231 that is to use the address data, a memory address interface unit 256 is arranged between the vector execution unit 203 and the second memory bank 231. The memory address interface unit 256 is similar to the memory address interface unit 256 of FIG. 3 and serves as a memory address interface unit for intermediate storage of the address items retrieved from the third memory bank 250.

FIG. 5 shows a memory address interface unit 256 according to a preferred embodiment of the invention. The memory interface has a memory 258 and a control unit 260. The control unit 260 comprises two memories:

a latency memory 262 holding the number of pipeline steps required to read from the third unit to the first memory.

a sample counter 264 arranged to keep track of the number of address samples to be read from the third unit 203, 250

The latency memory 262 is typically, but not necessarily, hardcoded. The sample count memory is arranged to be set for each operation as needed.

As discussed above the third unit is the one providing the address information. This may be a memory unit 250 as shown in FIG. 3 or a vector execution unit 203 as shown in FIG. 4.

When the data memory bank (not shown in FIG. 5) is setup to receive addressing data from the third, address providing, unit, the memory address interface unit 256 reads the first address data items from the third unit to its memory 258. In this way, when the execution unit that is to receive the data from the data memory bank sends a read signal to signal that it is ready to receive the first address item, this first address item is already stored in the memory address interface unit and can be sent to the second unit without any delay. Without the memory address interface unit, the procedure would be the execution unit sends a read signal to the memory unit the memory unit sends a read signal to the unit that is to provide the address the unit that is to provide the address responds by sending the first address.

The memory unit, upon receiving the first address, sends the data item to the execution unit.

Therefore, it would take several clock cycles before the execution unit could start working. Once started, however, addresses could be delivered at the appropriate pace.

For configuring the system the following steps are performed:

1. The core orders external addressing of the data memory by sending a signal to the memory interface to fill the queue to the data memory or by writing its control registers.
2. The memory address interface unit performs a sufficient number of read operations from the unit providing the address data to have in its memory a number of address items corresponding to the network latency. This means that the number of address items should correspond to the number of pipeline steps that have to be performed to retrieve the address.

During execution, the memory address interface unit continues to send address data items from its register to the data memory unit and to retrieve new address data items consecutively.

The functional unit receiving the data items will continue to send read signals to the memory unit until it has received the appropriate number of data items, and the memory unit will in turn send read signals to the memory address interface unit. Since some data items were already read from the address providing unit before the functional unit started sending read signals, this means that some read signals will be sent after all the address items have been read from the address providing unit.

Hence, the latency means that the memory address interface unit would continue to read address items from the third unit after it should stop. More precisely it would read as many address items too many as the number it stored in its register when it was being configured in step 2 above. To keep this from happening, the sample counter keeps track of the number of address samples that have been retrieved.

When the desired number of address samples have been read from the third unit to the memory address interface unit, the memory address interface unit stops retrieving new address samples although it will continue to receive read signals from the data memory. Instead, for the last address items, the memory address interface unit will empty its memory to provide these items to the data memory.

In a preferred embodiment, the address information is timed in such a way that the next address to be read from, or written to, reaches the second memory bank one clock cycle before it should actually be read from or written to.

Figure 6:
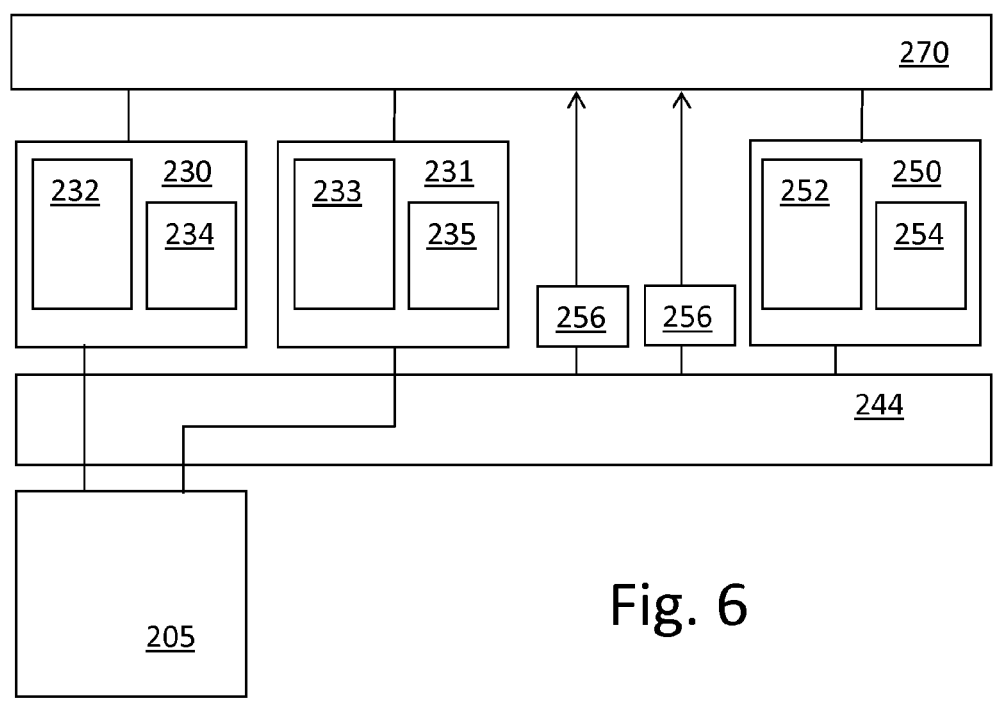
FIG. 6 illustrates a third embodiment of the invention.

FIG. 6 shows an advantageous embodiment of a processor according to the invention, in which a number of memory units can share a smaller number of memory address interface units. The same reference numbers as above are used for the same units as shown in previous Figures. As can be seen the processor according to this embodiment has the same units as the processors shown in FIGS. 3 and 4, all connected through the on-chip network 244. In addition, the embodiment of FIG. 6 has an address crossbar 270 arranged to provide address information to the desired memory unit 230, 231. In FIG. 6, two memory address interface units 256 are shown, both of which are connected to the address crossbar 270. The address crossbar then functions as a concentrator, selecting for each memory unit 230, 231 which one of the memory address interface units 256 it should receive addressing data from.

The embodiments of the invention are particularly useful in applications in which complex address patterns are used, which cannot be hard-coded at design time or are infeasible to store pre-defined in system memory. Such patterns could be based on run time parameters and must be computed dynamically.

For example, the OFDM-based telecommunications standard known as LTE (Long Term Evolution) uses dynamic allocation of frequencies to users. It is necessary to select the frequencies allocated to one user. In other situations it is desired to select all pilot tones, which may be done based on a table. Traditionally this is achieved by looking in a table to obtain the address information of the pilot tones, then load the desired data item from memory, shuffle the data in the frequencies to place the relevant data points adjacent each other and then store the data points back in the memory.

This type of address pattern cannot be programmed into a traditional address generation unit. This means that, for example, to perform an FFT of the pilot tones, the address pointer will have to be set several times for each operation, meaning that just the administration of the data will be so complicated that it will lower the performance (utilization) of the DSP processor significantly.

If, instead, the memory unit is programmed to retrieve a new address from the on-chip network, as discussed above, each data point to be used can be addressed directly, reducing the capacity needed for the administration of data, and thereby increasing the utilization and performance of the DSP.

Another application in which the present invention is particularly useful is in digital TV applications. Each OFDM symbol in DVB-T2 consists of up to 32768 subcarriers, resulting in a set of 32768 data points. This signal comprises pilot tones to be used as reference data, which are unevenly distributed throughout the frequency spectrum. Such an address pattern cannot be handled easily in traditional address generation units. According to the invention, the addresses could simply be stored in the third memory unit and picked from there by the memory unit providing data to the vector execution unit.

For digital TV it is also possible to use only a subset of the 32768 (32 k) points. The subset may be 16 k, 8 k, 4 k, 2 k or 1 k points, that is, half, quarter, etc., down to 1/32 of the points. According to the invention, it would only be necessary to store one table of the addresses, as a subset of this table could be selected by setting the addresses accordingly in the address memory.

The invention is also useful when addressing data is to be received from units that have unpredictable timing. Examples of such units are programmable co-processors or error correction units such as turbo decoders. Typically programmable co-processors can deliver an address stream with an average throughput matching the requirement, but with data delivered in small bursts. In the same way, error correction blocks will work iteratively on a set of data until it is correct, and it is impossible to predict exactly how many cycles this will take. Therefore the output from such units will be unpredictable bursts of data. A memory address interface unit according to the invention may be used to even out the bursts of data. If the register 258 shown in FIG. 5 is replaced with a FIFO queue the memory address interface unit can store the number of data contained in a burst and send them consecutively to the next unit.

The invention claimed is:

1. A digital signal processor comprising:
   at least one functional unit including one of a vector execution unit, a scalar execution unit or an accelerator;
   a first memory unit arranged to provide data to be operated on by the functional unit;
   a third unit;
   an on-chip network connecting the functional unit, the first memory unit and the third unit, wherein the third unit is arranged to provide addressing data in the form of an address vector to be used for addressing the first memory unit, said third unit being connected to the first memory unit through the on-chip network in such a way that the addressing data provided from the third unit can be used to control the reading from and/or the writing to the first memory unit; and:
   a memory address interface unit arranged to compensate for the latency between the first memory unit and the third unit by serving as an intermediate storage of the addressing data retrieved from the third unit, the memory address interface unit comprising:
   a memory address interface unit memory for storing addressing data from the third unit; and
   a control unit comprising a sample counter to keep track of a number of addressing data samples retrieved by the memory address interface unit from the third unit, such that when a set number of addressing data samples have been read from the third unit to the memory address interface unit, the memory address interface unit ceases retrieving addressing data from the third unit independent of the memory address interface unit continuing to receive read signals from the first memory unit.

2. A processor according to claim 1, wherein the third unit is an address memory unit to hold addressing data for addressing the first memory unit.

3. A processor according to claim 2, wherein the address memory unit comprises an address generation unit arranged to control the reading of addressing data from the address memory unit according to a predefined pattern.

4. A processor according to claim 1, wherein the third unit is a second functional unit.

5. A processor according to claim 1, wherein the first memory unit is a complex memory.

6. A processor according to claim 1, further comprising an address crossbar interconnecting at least the memory address interface unit and at least the first memory unit and a second memory unit, to enable addressing data to be provided to a selected one of the first and second memory units through the memory address interface unit.

7. A processor according to claim 1, adapted for telecommunications according to the LTE and/or LTE advanced standard.

8. A processor according to claim 1, adapted for digital television signals.

9. A method of addressing a memory in a digital signal processor comprising at least one functional unit including one of a vector execution unit, a scalar execution unit or an accelerator, and at least a first memory unit arranged to provide data to be operated on by the vector execution unit, and an on-chip network connecting the vector execution unit and the first memory unit, and a third unit arranged to provide addressing data for the first memory unit through the on-chip network in the form of an address vector, said method comprising the steps of:
   setting the first memory unit to receive addressing data from the third unit,
   providing addressing data from the third unit to the first memory unit,
   reading data from, or writing data to, the first memory unit according to the addressing data, and
   compensating for the latency between the first and the third unit using a memory address interface unit arranged to serve as an intermediate storage between the first and the third unit, for the addressing data retrieved from the third unit, the compensating comprising:
   ordering, by the functional unit, external addressing of the first memory unit;
   performing, by the memory address interface unit, a number of read operations from the third unit corresponding to a number of pipeline operations performed to retrieve the addressing data;
   sending, from the memory address interface unit, addressing data items to the first memory unit; and
   retrieving, by the memory address interface unit, new addressing data items from the third unit.

10. A method according to claim 9, wherein the third unit is an address memory unit to hold addressing data for addressing the first memory unit.

11. A method according to claim 10, comprising controlling reading of addresses from the address memory unit using an address generation unit arranged to control the reading of addressing data from the second memory unit according to a predefined pattern.

12. A method according to claim 9, wherein the third unit is a functional unit.

13. A method according to claim 9, wherein the first memory unit is a complex memory.

14. A method according to claim 9, comprising timing the address information in such a way that the next address to be read from, or written to, reaches the first memory unit one clock cycle before it should actually be read from or written to.

* * * * *